Dec. 8, 1970 K. E. MURNAN 3,545,119
ATTACHMENT FOR PREVENTING TWIST IN MONOFILAMENT FISHLINES
Filed Feb. 12, 1969
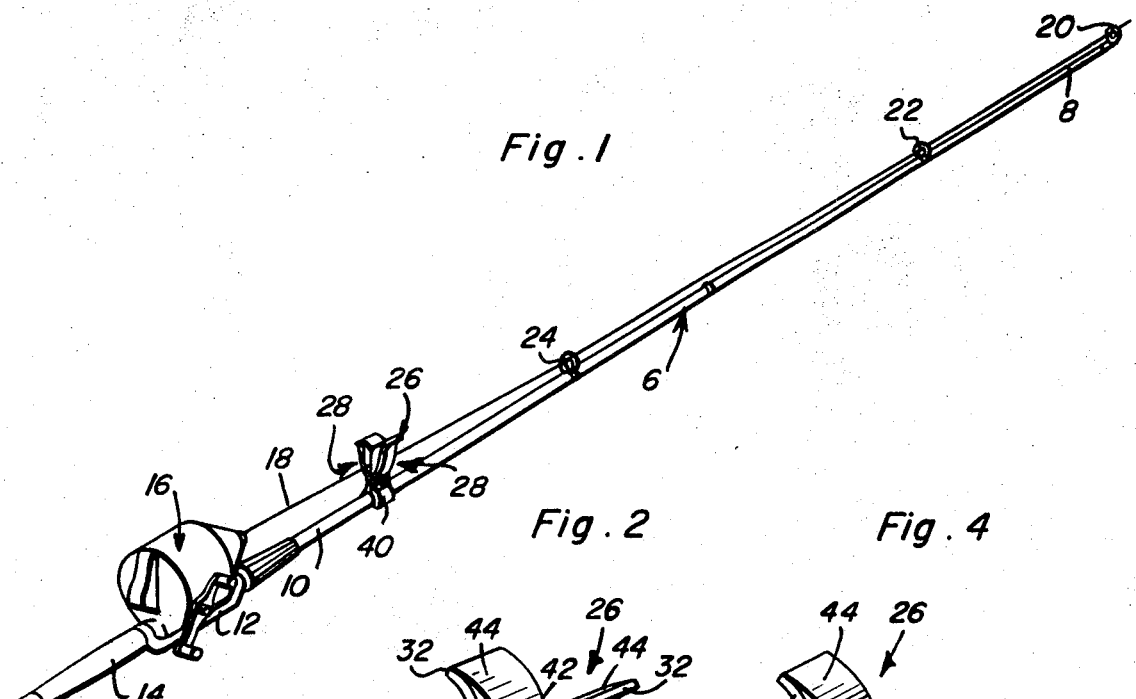
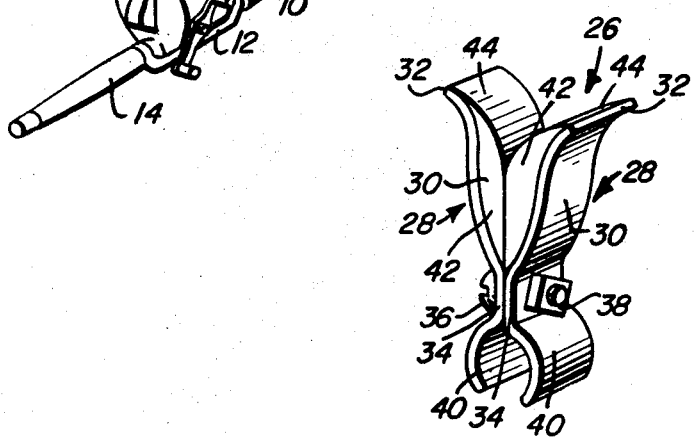
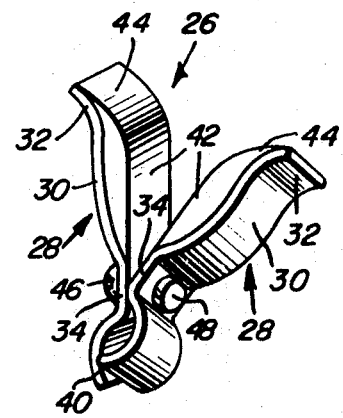
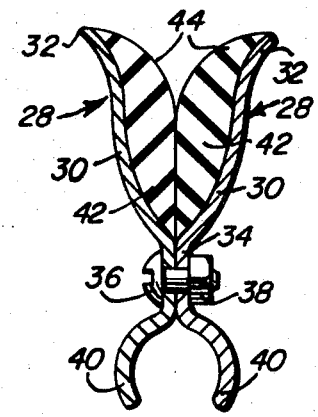
Kenneth E. Murnan
INVENTOR.
BY Clarence A. O'Brien
and Harvey B. Jackson
Attorneys

United States Patent Office 3,545,119
Patented Dec. 8, 1970

3,545,119
ATTACHMENT FOR PREVENTING TWIST IN MONOFILAMENT FISHLINES
Kenneth E. Murnan, Oklahoma City, Okla., assignor of fifty percent to Henry E. Ford, Oklahoma City, Okla.
Filed Feb. 12, 1969, Ser. No. 798,735
Int. Cl. A01k 87/00
U.S. Cl. 43—25                                  2 Claims

ABSTRACT OF THE DISCLOSURE

A pair of confronting mechanical fingers are pivotally connected intermediate their ends. One end portion of the fingers is formed to grip a fishing rod and the other end portion is lined with a resilient material flared outwardly at its end to provide a line guiding and retention surface.

---

This invention relates to twist preventing means which lends itself to feasible and practical use on a reel-equipped fishing rod and which is situated adjacent but in front of and is spaced from a spinning reel and which, generally stated, is characterized by a pair of opposed upstanding mechanical guide fingers for a monofilament fishline.

Briefly, the improved line guiding and twist-preventing device is such in construction that it can be made a permanent component part of the portion of the rod in a manner that it can be accurately lined up with the spinning reel and spaced a suitable distance beyond the locale of the reel for expedient and practical use. The device can be made an integral part of the rod or, as herein shown, may be a self-contained attachment which is applicable to the rod and temporarily but operatively secured in place. The means preferred is such in construction and capability that it functions to minimize twisting and kinking when the line is being retrieved and wound on the reel.

In carrying out a preferred embodiment of the invention the means which has been adopted for use is characterized by a pair of opposed mechanical fingers which are oriented relative to each other and which take the place of and obviate the need for using one's thumb and forefinger, as is customarily done by an angler. The coacting fingers have lower ends which are arcuately bent upon themselves and are transformed to provide a pair of rod embracing and mounting jaws. The median portions of these fingers are substantially flat and confront and contact each other in such a manner that simple fastening and pivoting means can be satisfactorily employed to operatively connect the median portions with each other.

To the ends desired, the upper free end portions of the respective mechanical fingers are flared outwardly. Then, too, the opposed major lengthwise surfaces of the fingers are wholly faced with compressibly resilient anti-slipping jaw-like grips between which a minimal portion of the fishing line can be seated yet slidingly drawn as the fishing line is reeled-in tautly but without tangling.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a handle-equipped fishing rod, a spinning reel with the monofilament or equivalent line threaded through line guide eyes and with a portion in front of the reel seated in the crotch portion of the improved twist preventing attachment.

FIG. 2 is a view in perspective on a suitably enlarged scale of the attachment by itself.

FIG. 3 is a central vertical sectional view through the attachment appearing in FIG. 2 with the fastening means appearing in elevation.

FIG. 4 is a perspective view similar to FIG. 2 showing the same mechanical fingers but with modified fastening means.

By way of introduction to the description of the details it is to be pointed out that the twist preventing attachment or means appearing in all of the views of the drawing is the same in construction except for the fastening means. This is to say, the fastening means in FIG. 4 varies slightly from the bolt and nut fastening means appearing in FIG. 2 for example. Otherwise the construction is the same and for this reason like reference numerals, except for the fastening means, will be employed to designate corresponding or like parts throughout the views.

With reference to FIG. 1 the numeral 6 designates an appropriate fishing rod whose outer end is denoted at 8 and whose inner end is denoted at 10 and is provided with a reel seat 12 and a companion handgrip or handle means 14. The spinning reel is denoted at 16 and is mounted in the seat portion of the handle means. The monofilament fishing line is denoted at 18 and is threaded through the guide eyes. The outer guide eye is denoted at 20, the intermediate one at 22 and the inward one at 24 and which is hereinafter designated as the rearward-most guide eye. This latter eye is in line with the line discharge of the reel and the improved twist preventing means or device is mounted between the eye 24 and the reel and is spaced from and located in front of the reel and is denoted, generally stated, by the numeral 26.

As before pointed out, it is within the purview of the inventive concept to construct the means 26 as a component or integral part of the rod. However and as experience has shown, the means is preferably, but not necessarily, in the form of a readily applicable, removable and adjustable attachment. The attachment comprises a pair of side by side or opposed duplicate mechanical fingers, said fingers being designated by the numeral 28. The finger proper is denoted at 30 and the upper end of each finger is deflected or flared outwardly as denoted at 32. The median flat portions 34 are placed face to face and are separably, adjustably and pivotally connected by a bolt 36 whose threaded shank is provided with an assembling and clamping nut 38. The lower ends of the jaws are substantially semi-circular and provide opposed rod embracing jaws 40. The opposed inner faces of the fingers are provided with rubber or equivalent compressibly resilient inserts. These inserts are sometimes referred to as elongated rubber or equivalent blocks and are denoted at 42. The blocks are shaped so that the upper ends taper or are gradually decreased in cross-sectional thickness so that they too are flared outwardly and away from each other as denoted at 44. These flared end portions define an appropriate seat or crotch for reception and guiding retention of that portion of the line which is passed therethrough in the manner shown in FIG. 1.

With reference again to FIG. 4 it will be seen that the component parts are of the construction already described and that the only difference here is that the flattened portions 34 are connected pivotally by a headed rivet 46 having a peened end as at 48. With this construction and arrangement the jaws 40 can be angled as shown in FIG. 4 in a manner that the device can be fitted over the smaller portion of the rod and then slid along the rod after which the jaws can be straightened up and the device can be frictionally retained in place. In either construction and arrangement, the result is substantially that shown in FIG. 1 wherein the device is lined up with and spaced forwardly from the reel to permit the line to cooperate therewith in the manner illustrated.

The invention or device is quite simple and easy to use. When ready to cast all that is necessary is to lift the monofilament line out of the seat or crotch as shown in FIG. 1. When the cast has been completed the angler simply lays or places the line between the guiding surfaces and the action of the reel draws the line down and functions to virtually eliminate twisting, knotting or retrieving difficulties customarily encountered by the average angler.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention.

What is claimed as new is as follows:

1. A twist preventing attachment for a monofilament fishing line which is readily applicable to and removable from a fishing rod forwardly of the rod's handle and reel which is carried by said handle comprising a pair of duplicate normally side by side elongated mechanical fingers of equal length and cross-sectional thickness from end to end and which are designed and adapted to serve in lieu of and obviate the need for use, as is usual, of the angler's thumb and index finger, said mechanical fingers having correspondingly constructed companion lower ends which are arcuately bent upon themselves and provide a pair of semi-circular rod embracing, gripping and mounting jaws, the respective median portions of said fingers being substantially flat and confronting and contacting each other and having alined holes, and headed fastening means passing through said holes and pivotally joining and operatively connecting said median portions together in jaw-forming and mounting relationship, the over-all line accommodating surfaces of said fingers having confronting lengthwise surfaces which are faced with compressibly resilient anti-slipping jaw-like grips between which an inserted portion of the fishing line can be seated and slidingly drawn as the fishing line is reeled in without difficult-to-cope with tangling and substantially free of knots, the upper ends of said fingers and also said grips being free and are flared outwardly in a manner to provide a substantially V-shaped line receiving and piloting crotch, said grips being of a cross-sectional thickness appreciably greater than the cross-sectional thickness of said fingers and the upper ends being decreased in thickness in a manner to provide converging line guiding and piloting cams.

2. A twist preventing attachment for a fishing rod comprising a pair of duplicate normally side-by-side elongated mechanical fingers of equal length and cross-sectional thickness from end-to-end, said fingers having correspondingly constructed companion lower portions which are arcuately bent upon themselves and provide a pair of semi-circular rod embracing, gripping and mounting jaws, the respective median portions of said fingers being substantially flat and confronting and contacting each other and being pivotally joined together in jaw forming and mounting relationship, the over-all line accommodating surfaces of said fingers having lengthwise surfaces which are provided and faced with compressibly resilient anti-slipping jaw-like grips between which an inserted portion of a fishing line is adapted to be seated and slidingly drawn as the line is reeled in, the upper ends of said fingers and said grips being free and flared outwardly in a manner to provide a substantially V-shaped line receiving and piloting crotch, said grips being of a cross-sectional thickness appreciably greater than the cross-sectional thickness of said fingers and the upper ends being decreased in thickness and in a manner to provide converging line guiding and piloting cams.

References Cited

UNITED STATES PATENTS

| | | | |
|---|---|---|---|
| 2,650,448 | 9/1953 | Lichtig | 43—25 |
| 2,791,858 | 5/1957 | Kernodle | 43—25 |
| 2,804,711 | 9/1957 | Kozar | 43—25 |
| 2,825,992 | 3/1958 | Miller | 43—25.2 |

WARNER H. CAMP, Primary Examiner